(12) United States Patent
Nakaoka et al.

(10) Patent No.: US 12,259,082 B2
(45) Date of Patent: Mar. 25, 2025

(54) EASILY POLYMERIZABLE SUBSTANCE HANDLING DEVICE

(71) Applicant: NIPPON SHOKUBAI CO., LTD., Osaka (JP)

(72) Inventors: Shingo Nakaoka, Himeji (JP); Koji Nomoto, Himeji (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 486 days.

(21) Appl. No.: 17/703,413

(22) Filed: Mar. 24, 2022

(65) Prior Publication Data

US 2022/0316627 A1    Oct. 6, 2022

(30) Foreign Application Priority Data

Mar. 31, 2021    (JP) .................................. 2021-059667

(51) Int. Cl.
*F16L 9/00*    (2006.01)
*C08L 33/02*    (2006.01)
(Continued)

(52) U.S. Cl.
CPC ............... *F16L 9/006* (2013.01); *C08L 33/02* (2013.01); *C08L 33/10* (2013.01); *F16L 29/002* (2013.01);
(Continued)

(58) Field of Classification Search
CPC ......... F16L 55/11; F16L 55/128; F16L 55/105
(Continued)

(56) References Cited

U.S. PATENT DOCUMENTS 2,845,952 A * 8/1958 Hill ..................... F16L 41/04
    408/239 R
3,070,129 A * 12/1962 Poulallion ............. F16L 55/136
    220/378
(Continued)

FOREIGN PATENT DOCUMENTS

JP    H07-48406 A    2/1995
JP    2001-81050 A    3/2001
(Continued)

OTHER PUBLICATIONS

Japanese Office Action dated Aug. 6, 2024, which issued in the corresponding Japanese Patent Application No. 2021-059667.
(Continued)

*Primary Examiner* — Patrick F Brinson
(74) *Attorney, Agent, or Firm* — Dickinson Wright PLLC (57) ABSTRACT

An easily polymerizable substance handling device is provided that can prevent generation of irregularities and steps between a pipeline and a cover member due to the cover member being installed at an opening part of the pipeline. A cover part 3 is formed to have a curved surface 3*a* on a side closer to inside of a pipeline 1. The shape of the surface 3*a* on the pipeline 1 side is preferably a concave shape when viewed from inside of the pipeline 1. The shape of the surface 3*a* of the cover part 3 on the pipeline 1 side is more preferably the shape of a curved surface having a curvature radius equal or approximate to that of the internal circumference of the pipeline 1. With this configuration, a polymer material is unlikely to be generated at the cover part 3 and around a gap 1*b* at an opening part 1*a*, and the frequency of cleaning can be reduced as compared to conventional cases.

11 Claims, 7 Drawing Sheets

(51) Int. Cl.
   *C08L 33/10* (2006.01)
   *F16L 29/00* (2006.01)
   *F16L 41/02* (2006.01)
   *F16L 53/30* (2018.01)

(52) U.S. Cl.
   CPC .............. *F16L 41/02* (2013.01); *F16L 53/30* (2018.01); *F16L 2201/40* (2013.01)

(58) Field of Classification Search
   USPC .......................................... 138/94, 94.3, 89
   See application file for complete search history.

(56) References Cited

U.S. PATENT DOCUMENTS

| | | | | |
|---|---|---|---|---|
| 5,035,266 | A * | 7/1991 | Benson | F16L 55/136 411/72 |
| 5,333,649 | A * | 8/1994 | Shimokawa | B29C 65/78 138/92 |
| 5,337,776 | A * | 8/1994 | Perry | F16K 17/162 137/68.29 |
| 5,462,998 | A * | 10/1995 | Tanifuji | B01J 19/2465 526/74 |
| 6,585,862 | B1 | 7/2003 | Nishimura et al. | |
| 6,691,733 | B1 * | 2/2004 | Morris | F16L 55/115 137/317 |
| 2010/0154988 | A1 * | 6/2010 | Richardson | F16L 55/1152 156/273.9 |

FOREIGN PATENT DOCUMENTS

| | | |
|---|---|---|
| JP | 2003103108 A | 4/2003 |
| JP | 2003-230827 A | 8/2003 |
| JP | 2007-39403 A | 2/2007 |
| JP | 2009-149587 A | 7/2009 |

OTHER PUBLICATIONS

European Office Action Dated Oct. 11, 2023, which issued in the corresponding European Patent Application No. EP 22 164 200.2.
European Search Report dated Aug. 3, 2022, which issued in the corresponding European Patent Application No. EP 22 16 4200.2.

* cited by examiner

Fig. 7

EASILY POLYMERIZABLE SUBSTANCE HANDLING DEVICE

BACKGROUND

1. Technological Field

The present invention relates to an easily polymerizable substance handling device.

2. Description of the Related Art

Conventionally, for example, a manhole or a hand hole for internal state check, sampling, or the like has been typically provided to a reactor or a distillation column that, for example, manufacture and refine an easily polymerizable substance such as (meth) acrylic acid, a heat exchanger, or a tank belonging to them. Various technologies have been proposed to prevent polymerization in a manhole, a hand hole, or the like when an easily polymerizable substance is handled, in particular.

Patent Literature 1 describes a handling device in which a tubular member through which fluid of gas, liquid, solid, or mixture thereof is introduced into or taken out of a device is disposed at a downward slope toward the inside of the device.

Patent Literature 2 describes a technology with which a dividing plate is provided between a manhole nozzle and an oxidation reactor body to prevent a recessed part on the inner surface of the reactor body so that oxidation reaction stably proceeds in the reactor body.

Patent Literature 3 describes a technology with which a core is provided in a manhole of a distillation column to prevent a dead space.

Patent Literature 4 describes a technology with which an aluminum foil is disposed to block a nozzle halfway through, thereby preventing entry of an easily polymerizable substance into the nozzle.

Patent Literature 1: Japanese Patent Laid-Open No. 2001-81050
Patent Literature 2: Japanese Patent Laid-Open No. 2003-230827
Patent Literature 3: Japanese Patent Laid-Open No. 2007-39403
Patent Literature 4: Japanese Patent Laid-Open No. 2009-149587

SUMMARY

A device described in each above-described literature is provided with a cover member for dividing the inner wall of a pipeline and a manhole opening in a device body. However, no particular method is mentioned that removes irregularities and steps generated between the inner wall of the pipeline and the cover member in the device body, in other words, irregularities and steps that can be generated at a section in a direction orthogonal to the extending direction of the pipeline when the cover member is disposed.

For example, Patent Literature 2, the dividing plate is disposed in contact with a stopper, which generates an angulated recess between the device body and the dividing plate. In the recess, gas or liquid stagnates and condenses, and accordingly, a polymer material may be formed.

When a polymer material is firmly fixed between the device body and a tubular member such as a manhole or to a fixation jig of the tubular member, it is extremely difficult to perform attachment and detachment of the components, and in addition, the polymer material potentially causes blockage of the device itself, a decrease in manufacturing efficiency, and the like. Thus, maintenance such as cleaning of the device body is needed in a short period.

The cover member or a partition member described in each above-described literature can reduce a dead space of the manhole opening and inhibit polymerization. However, as the diameter of the manhole increases, in particular, the amount of irregularities and steps due to disposition of the above-described cover member or partition member increases, and its polymerization-inhibition effect becomes insufficient. Even when the diameter is small, a slight amount of irregularities and steps generates a polymer material under a condition that polymerization is likely to occur, in particular, when a high polymerizable monomer is handled or when the temperature in the device is high. Thus, a new means for reducing the above-described amount of irregularities and steps is needed.

The present invention is intended to provide an easily polymerizable substance handling device that can inhibit or prevent generation of a polymer material in a pipeline by reducing irregularities and steps between the pipeline and a cover member when the cover member is disposed at an opening part of the pipeline.

An easily polymerizable substance handling device according to an aspect of the present application includes: a pipeline through which an easily polymerizable substance containing material can flow; a tubular member provided as a protrusion from the pipeline and communicating with inside of the pipeline through an opening part formed at the pipeline; and a cover part dividing inside of the pipeline from the tubular member; wherein the cover part has a curved surface on a side closer to inside of the pipeline and is disposed to block at least part of the opening part and have a gap with a peripheral part of the opening part.

According to the present invention, a cover part has a curved surface on a side closer to inside of a pipeline, and thus irregularities and steps are unlikely to be generated between the pipeline and the cover part. Accordingly, a polymer material is unlikely to be generated around the cover part, an opening part, and the gap between both members, and thus the frequency of maintenance such as cleaning can be reduced as compared to conventional cases. As a result, it is possible to achieve improvement of productivity and reduction in maintenance cost due to increase of a continuous operation time.

DETAILED DESCRIPTION OF EMBODIMENTS

An embodiment of the present invention will be described below with reference to the accompanying drawings.

In the present invention, "easily polymerizable substance" is a radical polymerizable monomer that can be polymerized depending on temperature, pressure, mixing, light, and the like. Examples of such easily polymerizable substance include unsaturated carboxylic acids such as acrylic acid, methacrylic acid, fumaric acid, maleic acid, and maleic anhydride, and their ester bodies.

A hydroxyl group containing compound that can form the above-described unsaturated carboxylic acid and ester bodies is, for example, aliphatic alcohol or alicyclic alcohol which has a carbon number of 1 to 12, and examples of such a hydroxyl group containing compound include a monohydric alcohol such as methanol, ethanol, n-butanol, isobutanol, sec-butanol, t-butanol, 1-pentanol, 2-pentanol, 3-pentanol, cyclopentanol, 1-hexanol, 2-hexanol, 3-hexanol, cyclohexanol, 1-heptanol, 2-heptanol, 3-heptanol, 1-octanol, isooctanol, 2-ethyl hexanol, isononyl alcohol, and lauryl alcohol; and a polyhydric alcohol such as ethylene glycol and 1,2-propane diol, and these may be of straight chain or have a branched structure.

An easily polymerizable substance is preferably, acrylic acid, methacrylic acid, acrylic acid ester, or methacrylic acid ester, more preferably acrylic acid, methacrylic acid, methyl acrylate, ethyl acrylate, butyl acrylate, 2-ethyl hexyl acrylate, 2-hydroxy ethyl acrylate, 2-hydroxy propyl acrylate, methyl methacrylate, ethyl methacrylate, butyl methacrylate, 2-ethyl hexyl methacrylate, 2-hydroxy ethyl methacrylate, or 2-hydroxy propyl methacrylate, sill more preferably acrylic acid or methacrylic acid.

In the specification of the present application, "handling" means at least one operation among reaction, distillation, extraction, absorption, storage, heat exchange, and the like, which are necessary for manufacturing an easily polymerizable substance. Accordingly, in the specification of the present application, "device" means a reactor, a distillation column, a heat exchanger, a tank, and the like used to handle the above-described reaction, distillation, extraction, absorption, storage, heat exchange, and the like. In addition, "inside of a pipeline" means a space (lumen) for flow and/or holding of an easily polymerizable substance in the above-described device.

Figure 1:
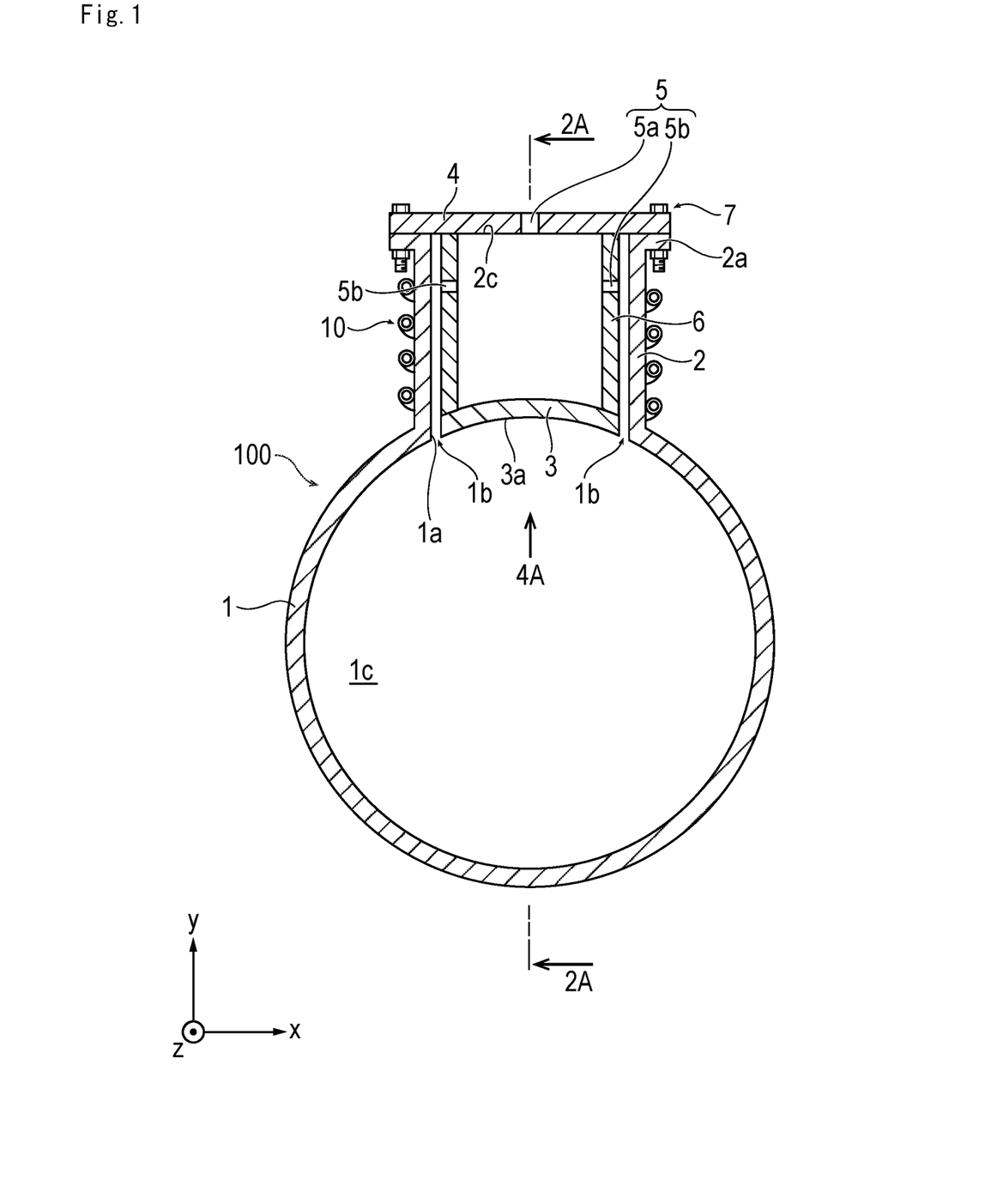
FIG. 1 is a cross-sectional view of a handling device according to an embodiment of the present invention in a direction orthogonal to an extending direction.
Figure 2:
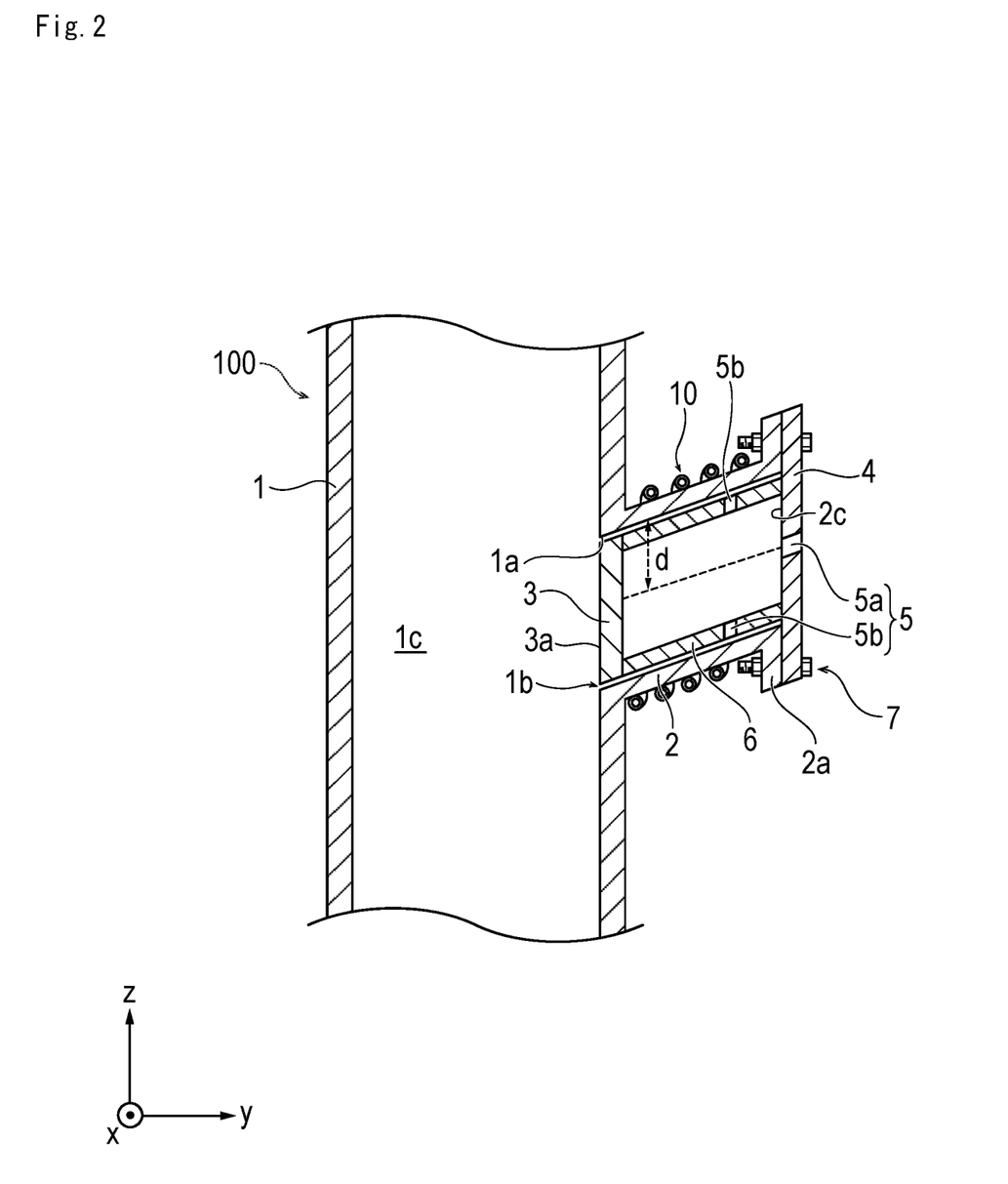
FIG. 2 is a cross-sectional view of the handling device in the extending direction.

FIG. 1 is an extending-direction orthogonal cross-sectional view (transverse sectional view) of a pipeline 1 of an easily polymerizable substance handling device 100 according to a preferable embodiment of the present invention in a direction orthogonal to an extending direction. FIG. 2 is an extending-direction cross-sectional view (longitudinal sectional view) of the pipeline 1 of the easily polymerizable substance handling device 100 according to the preferable embodiment of the present invention. The easily polymerizable substance handling device 100 is various devices that handle easily polymerizable substance, such as a reactor and a distillation column that, for example, manufacture and refine an easily polymerizable substance such as (meth) acrylic acid at a chemical plant, and a heat exchanger and a tank belonging to them. Hereinafter, the easily polymerizable substance handling device 100 is simply referred to as a handling device 100.

Arrow z in each drawing represents the extending direction of the pipeline. Arrow y in each drawing represents a direction orthogonal to arrow z and extending from the center of the pipeline 1 toward a tubular member 2. Arrow x in each drawing represents a direction orthogonal to the y-z plane. The section in FIG. 2 is a section taken along line 2A-2A in FIG. 1.

As illustrated in FIGS. 1 and 2, the handling device 100 may include the pipeline 1, the tubular member 2 provided as a protrusion from the pipeline 1 and communicating with inside 1c of the pipeline 1 through an opening part 1a formed at the pipeline 1, and a cover part 3 dividing the inside 1c of the pipeline 1 from the tubular member 2. The inner diameter of the pipeline 1 is preferably 300 mm or larger, more preferably 500 mm or larger, still more preferably 700 mm or larger.

The tubular member 2 is used as an inspection opening for internal check and inspection of the handling device 100, a sampling opening, or the like and may be, for example, a manhole, a handhole, or a spare nozzle installed at a gas phase part of the handling device.

As illustrated in FIG. 2, the tubular member 2 is preferably disposed at a tilt downward in a direction toward the center of the pipeline 1 with respect to the x-y plane, and the tilt angle of the tubular member 2 with respect to the x-y plane is preferably 3° to 70°, more preferably 5° to 60°. When the tubular member 2 is disposed in this manner, condensate liquid on the inner wall surface of the tubular member 2 immediately falls downward and is prevented from stagnation, and as a result, polymerization can be effectively prevented. The inner diameter of the tubular member 2 is preferably 80 mm or larger, more preferably 150 mm or larger, still more preferably 200 mm or larger. The roughness Ra (refer to JIS B0601-2013) of the inner wall surface of the tubular member 2 is preferably Ra≤0.5 µm, more preferably Ra≤0.3 µm. The roughness Ra of a surface of the cover part 3 on a side closer to the inside of the pipeline 1 is preferably Ra≤0.5 µm, more preferably Ra≤0.3 µm.

The cover part 3 is disposed to substantially block at least part of the opening part 1a, preferably the entire part, and have a gap 1b with a peripheral part of the opening part 1a.

An outer lid 4 may be attached to the tubular member 2 to cover an outer opening part 2c of the tubular member 2. A flange part 2a for fixing the outer lid 4 may be provided at an end part of the tubular member 2 disposed outside the pipeline 1.

A connection part 6 connecting to the cover part 3 may be provided to the outer lid 4. Since the handling device 100 is provided with the connection part 6, the cover part 3 together with the outer lid 4 can be installed at the opening part 1a and removed from the opening part 1a. The tubular member 2, the cover part 3, the outer lid 4, and the connection part 6 may be manufactured of metal such as stainless steel. However, specific material of which these members are made is not particularly limited. The outer lid 4 may be fixed to the flange part 2a of the tubular member 2 by a fixation member 7 including bolts and nuts. The cover part 3 is supported by the tubular member 2 at a position outside the pipeline 1 through the connection part 6 and the outer lid 4, and thus no irregularities nor steps, which would cause generation of polymer, are generated inside the pipeline 1.

The connection part 6 may be configured as, for example, a substantially cylindrical member in which a space is partitioned. However, specific shape and structure of the connection part 6 are not particularly limited as long as the connection part 6 has a structure that integrally connects the cover part 3 and the outer lid 4. For example, the connection part 6 may be configured as one or a plurality of bar-shaped members that connect the cover part 3 and the outer lid 4. When the connection part 6 is configured as one or a plurality of bar-shaped members, an opened region may be provided around the connection part 6 between the cover part 3 and the outer lid 4. Moreover, in a case in which the connection part 6 is configured as one or a plurality of bar-shaped members, a worker can easily feed oxygen containing gas, which will be described later, into the tubular member 2 through the above-described region when supplying the oxygen containing gas to the inner side of the outer lid 4 through a hole 5a of a gas supply unit 5 provided at the outer lid 4.

Figure 5:
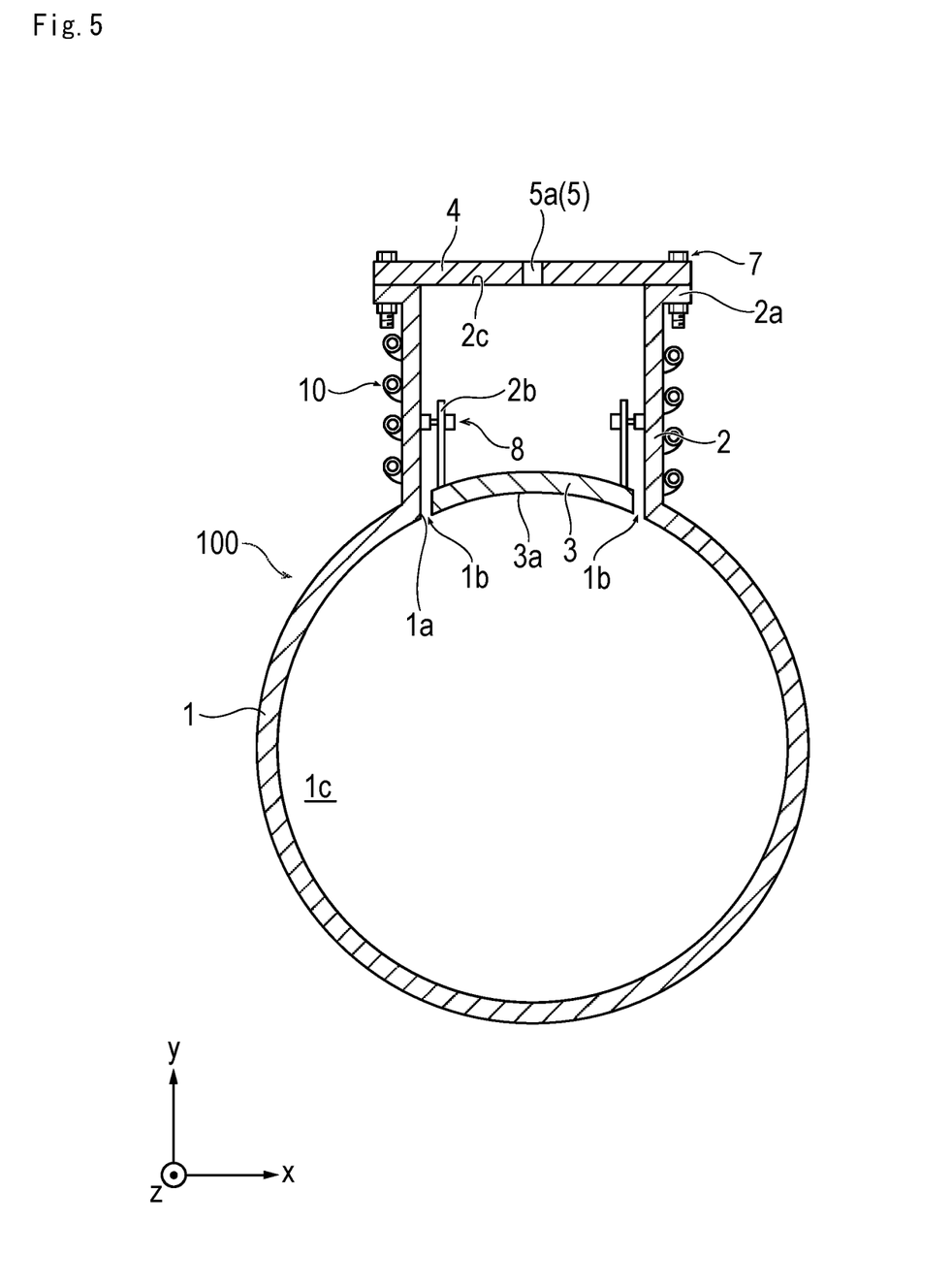
FIG. 5 is a cross-sectional view of the handling device according to a modification.

The handling device 100 may include no connection part 6, for example, as in a modification illustrated in FIG. 5. In this configuration, the cover part 3 is preferably connected to the inner wall of the tubular member 2 through a support member 2b of a predetermined shape. The support member 2b may be fixed to an optional place on the inner wall of the tubular member 2 by a fixation member 8 such as a packing or a bolt. When the cover part 3 is connected to the inner wall of the tubular member 2, in other words, the cover part 3 is supported by the tubular member 2 at a position outside the pipeline 1, irregularities and steps due to the support member 2b (refer to FIG. 5) and the fixation member 8, which would cause generation of polymer, are not generated inside the pipeline 1.

At least one of the tubular member 2, the outer lid 4, and the connection part 6 may include the gas supply unit 5 for supplying oxygen containing gas into the tubular member 2. As illustrated in FIGS. 1 and 2, the gas supply unit 5 may be constituted by the hole 5a formed at the outer lid 4, and a hole 5b formed at a side surface of the connection part 6. For example, a connector that can be coupled with a gas supply pipe may be installed in the hole 5a of the outer lid 4. Oxygen containing gas can be supplied from the hole 5a of the outer lid 4 into the outer lid 4 through the gas supply pipe. The oxygen containing gas supplied through the hole 5a of the outer lid 4 is supplied through the hole 5b of the connection part 6 to the gap between the tubular member 2 and the connection part 6 and the gap 1b between the tubular member 2 and the cover part 3, which can prevent formation of a polymer material due to liquid stagnation around the gap 1b. Note that, for example, the shapes, numbers, and disposition of the holes 5a and 5b constituting the gas supply unit 5 are not particularly limited but the number of holes 5b is preferably two or more, more preferably four or more, from the view point of supplying gas uniformly.

A temperature adjustment unit 10 configured to adjust the temperature inside the tubular member 2 may be provided to the tubular member 2. The temperature adjustment unit 10 may be configured as a known temperature adjustment member such as an electric heater, a steam jacket, a hot-water jacket, a cooling water jacket, a steam trace, a hot-water trace, or a cooling water trace. Note that temperature adjustment may include temperature retention. When the temperature inside the tubular member 2 is adjusted by the temperature adjustment unit 10, it is possible to prevent condensation of gas containing an easily polymerizable substance and prevent generation of a polymer material in the tubular member 2.

Figure 6:
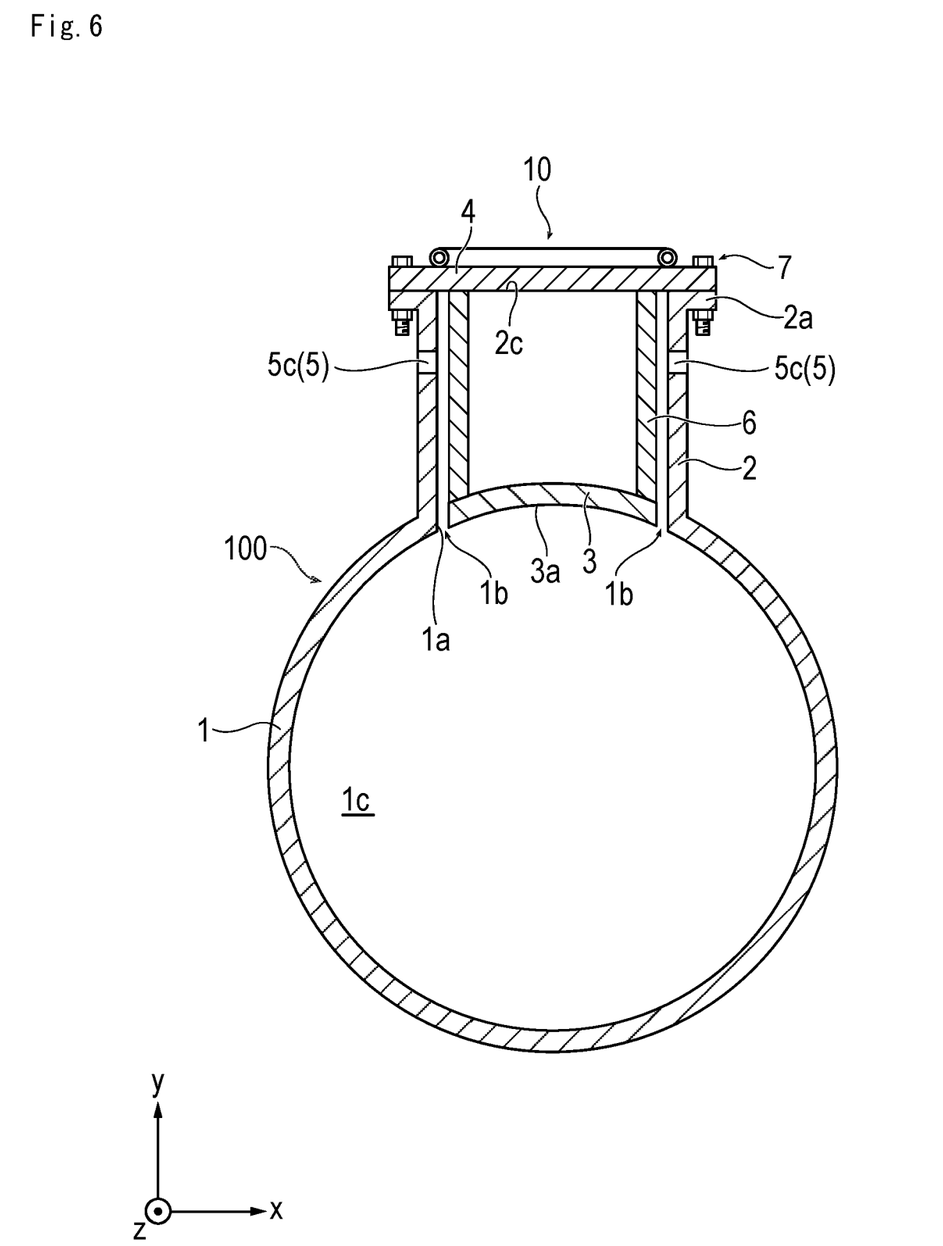
FIG. 6 is a cross-sectional view of the handling device according to a modification.

A position at which the gas supply unit 5 is provided in the handling device 100 is not particularly limited as long as the gas supply unit 5 can supply oxygen containing gas into the tubular member 2. For example, as in a modification illustrated in FIG. 6, a hole 5c as the gas supply unit 5 may be provided at the tubular member 2. In this configuration, the worker may couple a gas supply pipe to a connector installed in the hole 5c and supply oxygen containing gas into the tubular member 2 through the gas supply pipe. The oxygen concentration of supplied oxygen containing gas is not particularly limited but a range of the concentration is preferably, for example, 1 to 21 vol %, more preferably 3 to 15 vol %, still more preferably 5 to 10 vol %.

A position at which the temperature adjustment unit 10 is provided in the handling device 100 is not particularly limited as long as the temperature adjustment unit 10 can adjust the temperature inside the tubular member 2. As in the modification illustrated in FIG. 6, the temperature adjustment unit 10 may be disposed at the outer lid 4. Note that the temperature adjustment unit 10 may be provided at both of the tubular member 2 and the outer lid 4.

As illustrated in FIG. 1, the pipeline 1 may have a circular xy-directional section. The cover part 3 is formed to have a curved surface 3a (surface 3a on the inner side of the pipeline 1) on the side closer to the inside of the pipeline 1. As illustrated in FIG. 1, the shape of the surface 3a may be a concave shape when viewed from the inner side of the pipeline 1.

Figure 3A:
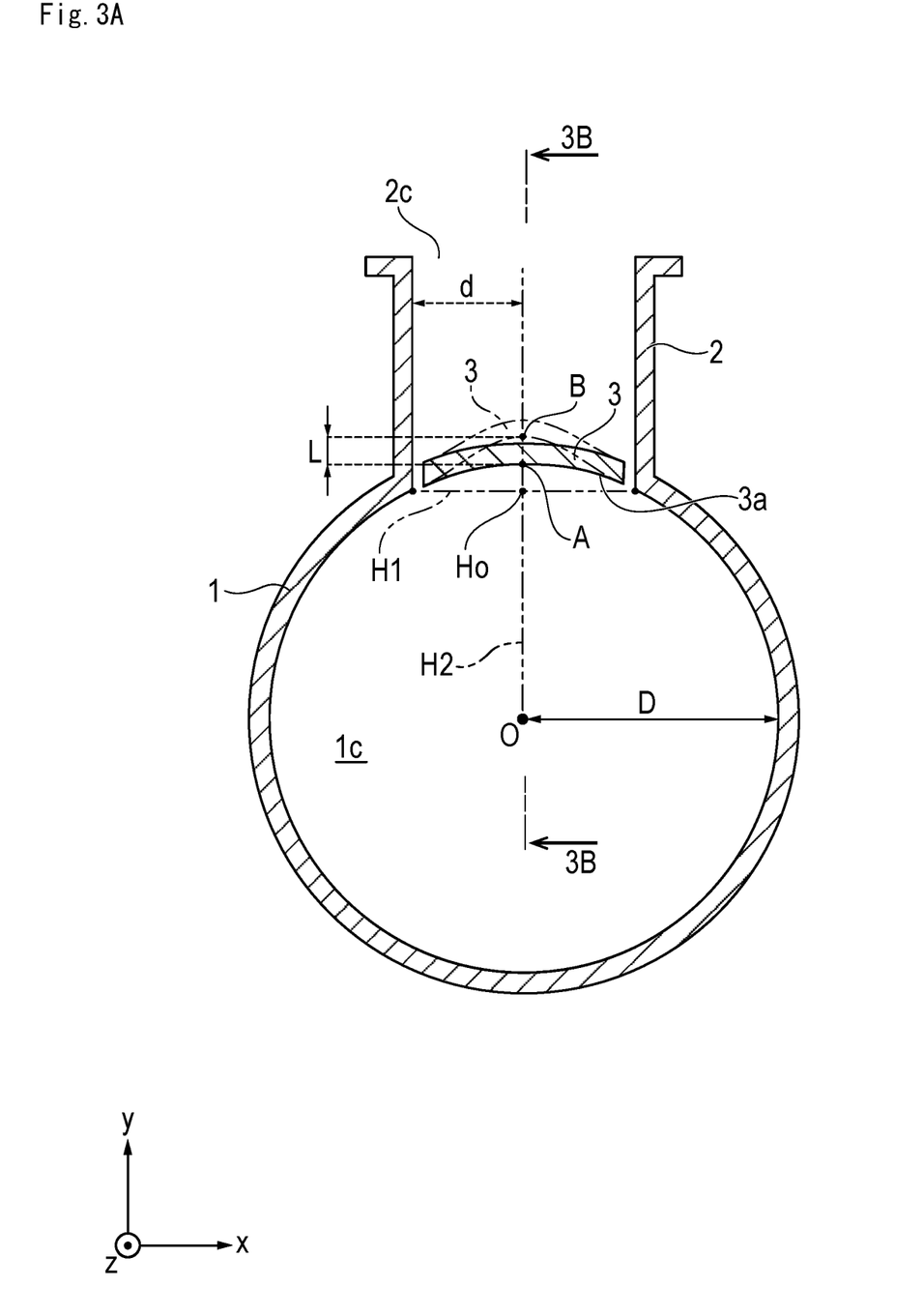
FIG. 3A is an x-y cross-sectional view for description of a curved surface shape of a cover part.
Figure 3B:
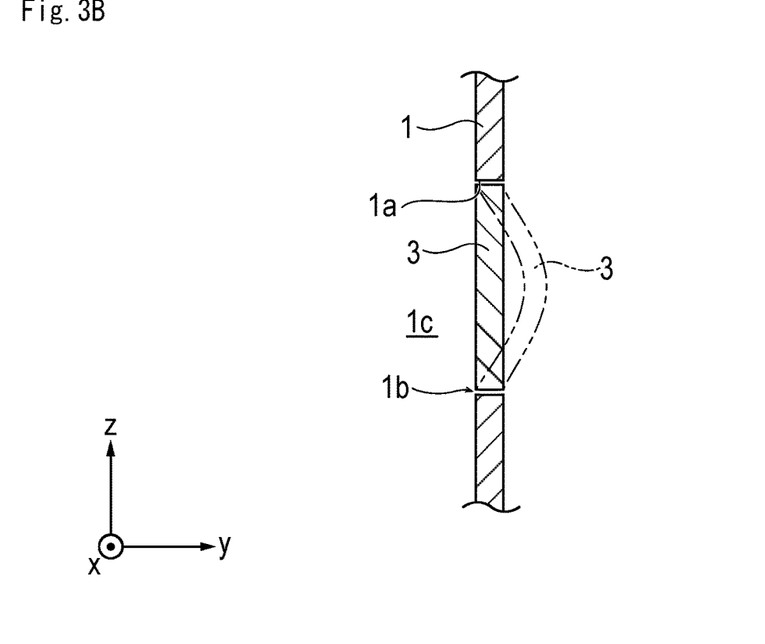
FIG. 3B is a y-z cross-sectional view for description of the curved surface shape of the cover part.

FIG. 3A is an x-y cross-sectional view for description of the curved surface shape of the cover part 3. FIG. 3B is a y-z cross-sectional view for description of the curved surface shape of the cover part 3. More preferably, as illustrated in FIGS. 3A and 3B, the shape of the surface 3a of the cover part 3 on the pipeline 1 side may be the shape of a curved surface having a curvature radius equal or approximate to that of the internal circumference of the pipeline 1.

As exemplarily illustrated in FIG. 3A, when a straight line H1 connects both ends of a surface of a junction part of the pipeline 1 and the tubular member 2 on the pipeline 1 side at an extending-direction orthogonal section in the direction orthogonal to the extending direction of the pipeline 1, an indicator X indicating the size of a recess corresponding to shift of a center B of the cover part 3 on the inner side or outer side of the pipeline 1 with respect to a reference at the position of the surface 3a where the surface 3a of the cover part 3 on the inner side of the pipeline 1 and the inner wall surface of the pipeline 1 coincide with each other on circles of identical radii is expressed by Equation (1) below.

$$X=L/\{D-\sqrt{(D^2-d^2)}\} \qquad (1)$$

In the above equation, D represents the radius (linear distance from the center O of the pipeline 1 to the inner wall surface of the pipeline 1) of the circular section of the pipeline 1 on the x-y plane, and d represents the radius of the tubular member 2 on the x-z plane (refer to FIGS. 2 and 3A).

In addition, L represents the length of the recess corresponding to shift of the cover part 3 on the inner side or outer side of the pipeline 1 with respect to the reference position. Specifically, L represents the distance between the centers A and B illustrated in FIG. 3A. The center A is an exemplary reference position of the cover part 3 and is a point where a straight line H2 connecting a center O of the pipeline 1 and a midpoint Ho of the straight line H1 connecting both ends of the surface of the junction part of the pipeline 1 and the tubular member 2 on the inner side surface of the pipeline 1 on the x-y plane intersects the surface 3a of the cover part 3 on the inner side of the pipeline 1 when the surface 3a of the cover part 3 on the inner side of the pipeline 1 and the inner wall surface of the pipeline 1 coincide with each other on circles of identical radii. The center B is a point where the above-described straight line H2 intersects with the surface 3a of the cover part 3 on the inner side of the pipeline 1 actually installed. Note that the cover part 3 as the reference of the center B is exemplarily illustrated with a virtual line in FIG. 3A.

The above-described Equation (1) preferably satisfies $X \leq 0.5$, more preferably $X \leq 0.3$, still more preferably $X \leq 0.2$, and most preferably $X \leq 0.1$. With this configuration, the surface 3a of the cover part 3 on the pipeline 1 side is moderately recessed as compared to the circular outer periphery of the pipeline 1 and not excessively recessed outside the circular outer periphery of the pipeline 1, thereby inhibiting or preventing generation of a polymer material on the surface 3a of the cover part 3 on the pipeline 1 side.

Figure 4:
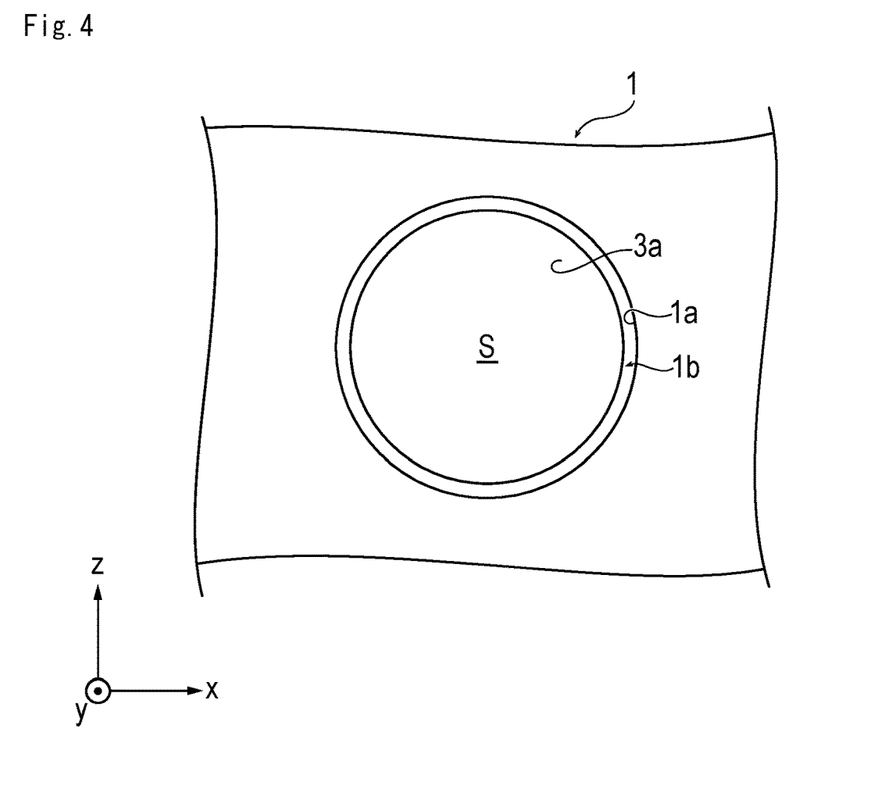
FIG. 4 is a front view of the cover part covering an opening part.

As illustrated in FIG. 4, in a front view of the opening part 1a from the inside 1c of the pipeline 1 (front view when viewed in the direction of arrow 4A illustrated in FIG. 1), projection area S that the cover part 3 blocks the opening part 1a may be 80% to 99.9% inclusive of the projection area of the opening part 1a, preferably 90% to 99.9% inclusive, more preferably 95% to 99.9% inclusive. Since the cover part 3 is inserted into the opening part 1a, it is difficult to set the dimensions of the cover part 3 to be completely identical to those of the opening part 1a. However, in order to prevent unnecessary inflow of an easily polymerizable substance toward the tubular member 2 side, it is preferable to have no gap between the cover part 3 and the peripheral part of the opening part of the pipeline 1 as much as possible.

As described above, in the handling device 100, the cover part 3 may be formed to have the concave surface 3a on the side closer to the inside of the pipeline 1 when viewed from the inside of the pipeline 1 (refer to FIG. 3).

Thus, the cover part 3 can substantially block the opening part 1a to generate no irregularities nor steps with the peripheral part of the opening part 1a of the pipeline 1 in the extending-direction orthogonal section of the pipeline 1. Accordingly, a polymer material is unlikely to be generated around the cover part 3, the opening part 1a, and the gap 1b in the handling device 100, and thus the frequency of maintenance such as cleaning can be reduced as compared to conventional cases.

When the cover part 3 that is convex protrudes in the pipeline 1, as well, the opening part 1a can be substantially blocked to generate no irregularities nor steps with the peripheral part of the opening part 1a of the pipeline 1 since the protrusion of the cover part 3 is a curved surface. Accordingly, a polymer material is unlikely to be generated around the cover part 3, the opening part 1a, and the gap 1b, and thus the frequency of maintenance such as cleaning can be reduced as compared to conventional cases.

Figure 7:
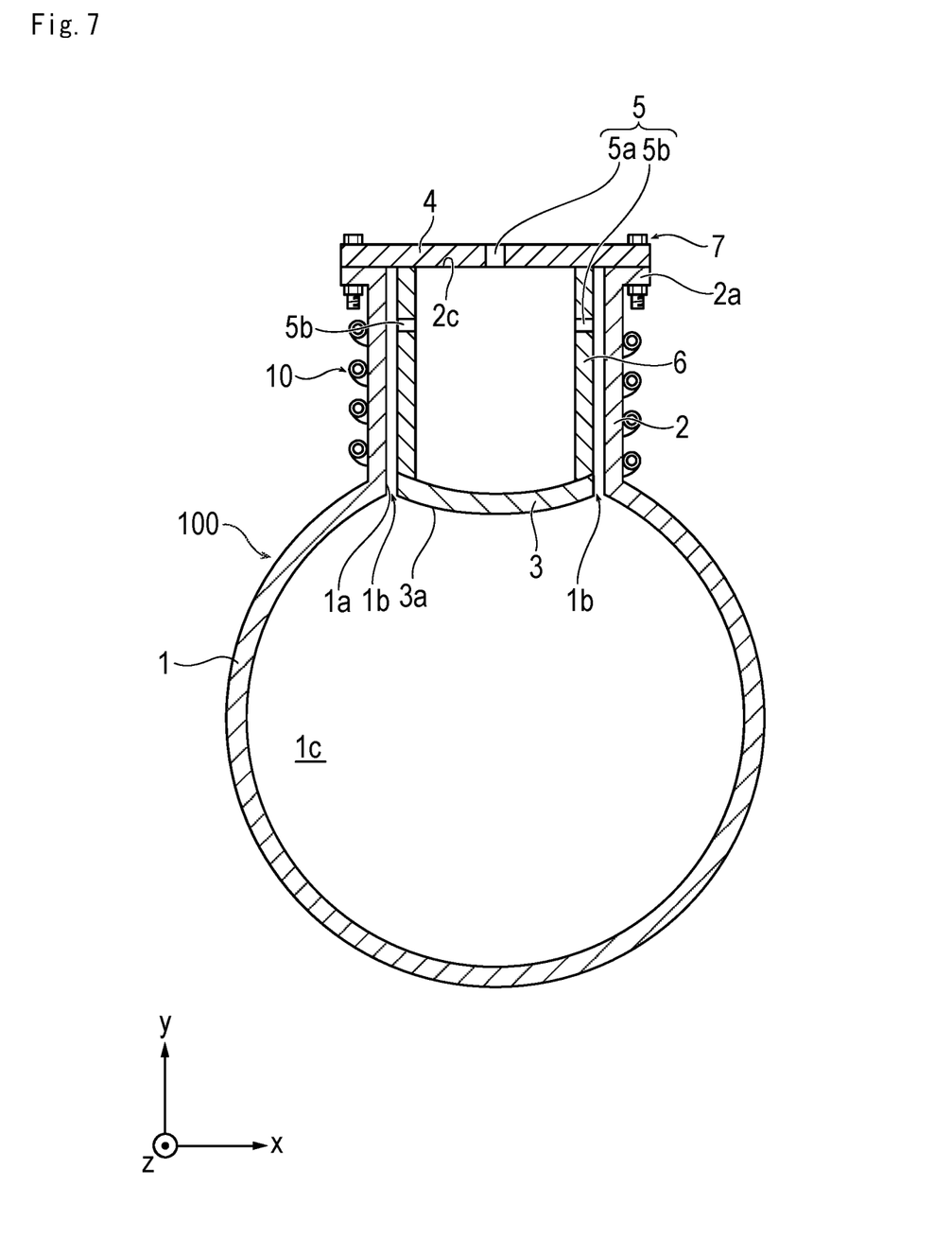
FIG. 7 is a cross-sectional view of the handling device according to a modification.

Note that the surface of the cover part 3 on the pipeline 1 side may be entirely curved in the extending-direction orthogonal section of the pipeline 1 to generate no irregularities nor steps with the peripheral part of the opening part 1a of the pipeline 1. Thus, for example, a part of the cover part 3 including a central position of the cover part 3 (central position of the extending-direction orthogonal section of the pipeline 1) may be curved enough to prevent liquid stagnation. This is same for the cover part 3 according to the embodiment illustrated in FIGS. 1 to 6 and the cover part 3 according to a modification illustrated in FIG. 7.

Hereinabove, the easily polymerizable substance handling device according to the present invention is described with reference to the embodiments and the modifications, and the present invention is not limited only to each described configuration but can include changes as appropriate based on the description of the claims.

The structure, disposition, material, and the like of each component described in the specification may be changed as appropriate, and for example, any additional member described by illustration may not be used as appropriate and any other additional member may be used as appropriate.

REFERENCE SIGNS LIST 1 pipeline
1a opening part
1b gap
1c inside of the pipeline
2 tubular member
2a flange part
2b support member
2c outer opening part
3 cover part
3a surface of the cover part on the pipeline side
4 outer lid
5 gas supply unit
5a, 5b, 5c hole
6 connection part
7 fixation member
8 fixation member
10 temperature adjustment unit
100 easily polymerizable substance handling device
S projection area
z extending direction of the pipeline
y direction orthogonal to z and extending from the center of the pipeline toward the tubular member
x direction orthogonal to the y-z plane

What is claimed is:

1. An easily polymerizable substance handling device comprising:
   a pipeline through which an easily polymerizable substance containing material can flow;
   a tubular member provided as a protrusion from the pipeline and communicating with inside of the pipeline through an opening part formed at the pipeline; and
   a fixed cover part dividing inside of the pipeline from the tubular member,
   wherein the cover part has a curved surface on a side closer to inside of the pipeline and is disposed to block at least part of the opening part and have a gap with respect to a peripheral part of the opening part that extends from the opening part along the tubular member.

2. An easily polymerizable substance handling device comprising:
   a pipeline through which an easily polymerizable substance containing material can flow;
   a tubular member provided as a protrusion from the pipeline and communicating with inside of the pipeline through an opening part formed at the pipeline; and
   a cover part dividing inside of the pipeline from the tubular member,
   wherein the cover part has a curved surface on a side closer to inside of the pipeline and is disposed to block at least part of the opening part and have a gap with respect to a peripheral part of the opening part;
   wherein the cover part has a concave surface on the side closer to inside of the pipeline when viewed from the side closer to inside of the pipeline.

3. The easily polymerizable substance handling device according to claim 2, wherein
the pipeline has a circular section in a direction orthogonal to an extending direction of the pipeline, and
X≤0.5 is satisfied in Equation (1) below:

$$X = L/\{D - \sqrt{(D^2 - d^2)}\} \quad (1)$$

D: radius of the pipeline
d: radius of the tubular member
L: length of a recess corresponding to shift of the cover part on an inner side or outer side of the pipeline with respect to a reference point at a position where a surface of the cover part on the inner side of the pipeline and an inner wall surface of the pipeline coincide with each other on circles of identical radii.

4. The easily polymerizable substance handling device according to claim 2, wherein the tubular member has an inner diameter equal to or larger than 80 mm.

5. The easily polymerizable substance handling device according to claim 2, wherein the opening part has a projection area defined by an inner wall surface of the tubular member at a front view of the opening part, and the cover part has a projection area defined by an area of the curved surface at a front view of the opening part, the projection area of the cover part being configured to block the front view of the opening part by 80% to 99.9% inclusive of the projection area of the opening part.

6. An easily polymerizable substance handling device comprising:
a pipeline through which an easily polymerizable substance containing material can flow;
a tubular member provided as a protrusion from the pipeline and communicating with inside of the pipeline through an opening part formed at the pipeline;
a cover part dividing inside of the pipeline from the tubular member, the cover part having a curved surface on a side closer to inside of the pipeline and is disposed to block at least part of the opening part and have a gap with respect to a peripheral part of the opening part; and
an outer lid that is attachable to the tubular member to cover an outer opening part of the tubular member, wherein at least one of the tubular member and the outer lid includes a gas supply unit for supplying oxygen containing gas to inside of the tubular member.

7. The easily polymerizable substance handling device according to claim 6, comprising a connection part connecting the cover part and the outer lid.

8. The easily polymerizable substance handling device according to claim 2, wherein the cover part is supported by the tubular member at a position outside the pipeline.

9. An easily polymerizable substance handling device comprising:
a pipeline through which an easily polymerizable substance containing material can flow;
a tubular member provided as a protrusion from the pipeline and communicating with inside of the pipeline through an opening part formed at the pipeline; and
a cover part dividing inside of the pipeline from the tubular member,
wherein the cover part has a curved surface on a side closer to inside of the pipeline and is disposed to block at least part of the opening part and have a gap with respect to a peripheral part of the opening part;
wherein the tubular member is disposed at a tilt downward in a direction toward the center of the pipeline with respect to a plane orthogonal to an extending direction of the pipeline.

10. An easily polymerizable substance handling device comprising:
a pipeline through which an easily polymerizable substance containing material can flow;
a tubular member provided as a protrusion from the pipeline and communicating with inside of the pipeline through an opening part formed at the pipeline;
a cover part dividing inside of the pipeline from the tubular member, the cover part having a curved surface on a side closer to inside of the pipeline and is disposed to block at least part of the opening part and have a gap with respect to a peripheral part of the opening part; and
a temperature adjustment unit for adjusting the temperature of the tubular member.

11. The easily polymerizable substance handling device according to claim 2, wherein the easily polymerizable substance is (meth) acrylic acid or (meth) acrylic acid ester.

* * * * *